United States Patent [19]
Coudroy

[11] Patent Number: 5,211,476
[45] Date of Patent: May 18, 1993

[54] TEMPERATURE RECORDING SYSTEM
[75] Inventor: Jerome Coudroy, Vitre, France
[73] Assignee: Allflex Europe S.A., France
[21] Appl. No.: 845,031
[22] Filed: Mar. 3, 1992
[30] Foreign Application Priority Data
  Mar. 4, 1991 [NZ] New Zealand .................. 237302
[51] Int. Cl.⁵ .................. G01K 1/02; G01K 3/00; G01D 5/26
[52] U.S. Cl. .................. 374/102; 374/208; 340/870.17
[58] Field of Search .................. 374/102, 208; 340/870.17

[56] References Cited
U.S. PATENT DOCUMENTS

| | | | |
|---|---|---|---|
| 4,614,441 | 9/1986 | Wolf | 374/130 |
| 4,635,055 | 1/1987 | Fernandes et al. | 374/152 |
| 4,642,785 | 2/1987 | Packard et al. | 374/102 |
| 4,718,776 | 1/1988 | Gilland et al. | 374/208 |
| 4,996,909 | 3/1991 | Vache et al. | 374/208 |
| 5,033,864 | 7/1991 | Lasecki et al. | 374/151 |
| 5,106,202 | 4/1992 | Anderson et al. | 374/144 |

FOREIGN PATENT DOCUMENTS 3139663  4/1983  Fed. Rep. of Germany ...... 374/102

Primary Examiner—William A. Cuchlinski, Jr.
Assistant Examiner—Diego F. F. Gutierrez
Attorney, Agent, or Firm—Blakely, Sokoloff, Taylor & Zafman

[57] ABSTRACT

A temperature monitoring device having a sealed inviolatable housing in which a temperature sensor is located. Temperature recording means within the housing obtain successive temperature readings as sensed by the temperature sensor over a period of time. Temperature storage means also within the housing provide for storage of the temperature readings, and infrared data transmission means within the housing enable the stored temperature reading to be transferred to a reader device.

12 Claims, 8 Drawing Sheets

TEMPERATURE RECORDING SYSTEM

This invention relates to a temperature recording system

BACKGROUND OF THE INVENTION

Field of the Invention

One of the problems which occurs with the transportation and/or storage of goods, especially food products, is the monitoring of temperatures. This is primarily a problem with the conservation of deep frozen and refrigerated food products throughout the cold chain. By being able to monitor temperature the manufacturer, re-seller, transport operator or the like can determine whether there is or has been a problem with the temperature regulating mechanism and thereby whether the goods may have spoiled, deteriorated, become damaged etc.

The object of the present invention is to provide a temperature monitoring device which can be placed in a temperature controlled environment and permits continuous temperature monitoring to be carried out.

SUMMARY OF THE INVENTION

Broadly in one aspect of the invention there is provided a temperature monitoring device comprising a sealed housing adapted for placement within an environment the temperature of which is to be monitored, said housing having associated therewith a temperature probe and a storage system in which temperature readings can be stored, there being further provided a contactless communication means whereby said stored temperature readings can be transferred to a reader.

According to a second broad aspect of the invention there is provided a temperature recording system comprising a temperature monitoring device as defined in the first broad aspect and a reader, said reader including locating means with which the device can be positioned such that the communication means of the device registers with a communication means of the reader whereby temperature information stored in said storage means of the device can be transferred between said device and said reader.

DESCRIPTION OF THE PREFERRED EMBODIMENT

Figure 1:
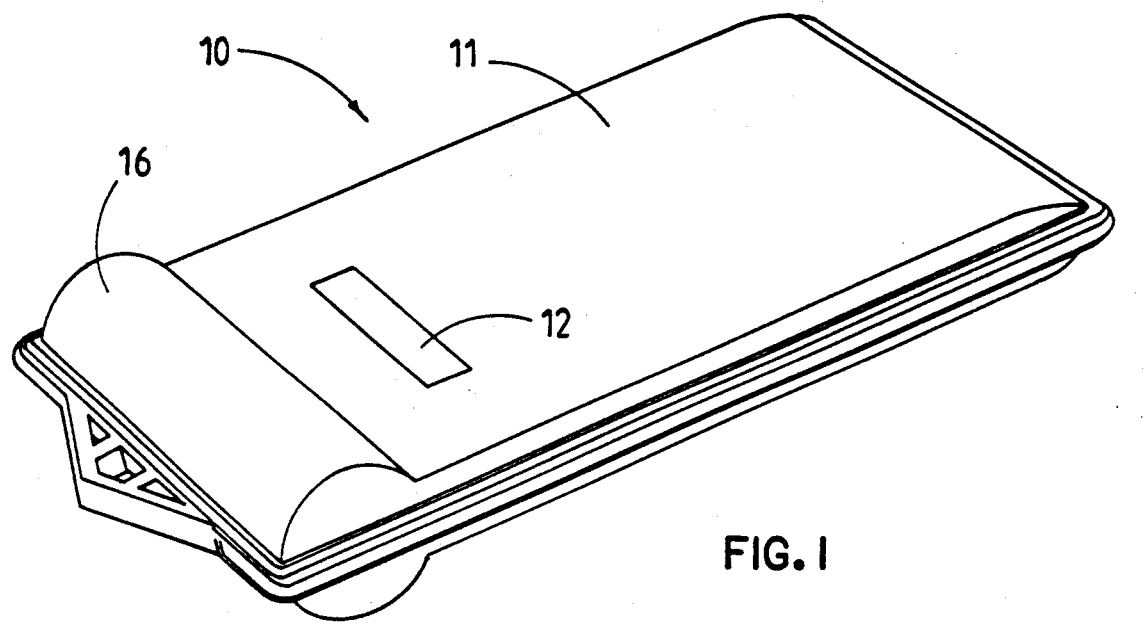
FIG. 1 is perspective view of the recording device.
Figure 2:
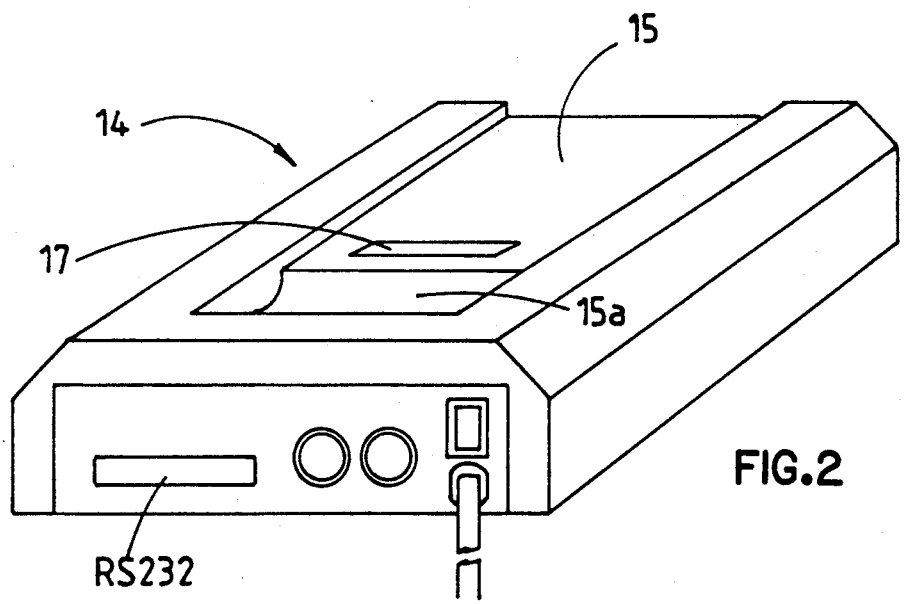
FIG. 2 is a perspective view of the reader.

The temperature recording device 10 comprises a rugged housing 11 this housing being substantially unbreakable, watertight and inviolable. Infrared transmission of data stored in the device (via window 12) means that the device has no external connectors or contacts. By using an infrared data transmission system there is eliminated any difficulties which may arise by deposits of ice, moisture or the like on externally accessible connectors or contacts.

The recorder device 10 includes, as will hereinafter be described, an independent power supply, a temperature probe and a storage system as well as the previously mentioned infrared data transmission. In the preferred form of the invention the housing 11 is of injection moulded construction of an ABS plastics material approved for contact with foodstuffs. The housing is preferably of compact size whereby it can be conveniently placed within an environment in which temperature is being controlled and is required to be monitored.

In use recorder device 10 takes recordings of temperature at set intervals say every fifteen minutes. In one preferred form of the invention the capacity of the memory within the device is sufficient for up to 7500 temperature readings per cycle after each zero reset. In addition to the storage of temperatures, however, the recorder is able to memorize other data which may be necessary for the correct storage and/or routing of products. This additional data can include date and time, name of company, address details, a temperature setpoint and where the recorder is being used in a transportation situation the vehicle number and possibly name of driver.

Once the data has been introduced it cannot be modified and when saturated the memory can be zero reset. This latter operation can only be performed by the owner of the recorder. Thus in use the recorder can be placed in its site of use such as in a cold room, in the middle of a pallet, in a container, in a refrigerated truck, in a cellar, in a medical environment and due to its compactness the recorder is sufficiently versatile to even be used in the middle of a pot or bunch of flowers.

At an appropriate time such as at the completion of transportation or storage the recorder can be removed and the contents thereof interrogated by a reader 14. This reader includes a recess 15 on which the recorder 10 can be placed. In the preferred form of the invention housing 11 has a bulbous end portion 16 which conveniently houses the power source which in the preferred form of the invention can be lithium batteries having an operating life of up to four years. This bulbous portion 16 locates in an enlarged recess 15a in recess 15 thereby forming an additional means of accurately locating the recorder 10. Such location is necessary such that the window 12 of the infrared transmission means of the reader is located over a similar window 17 in recess 15.

Figure 3:
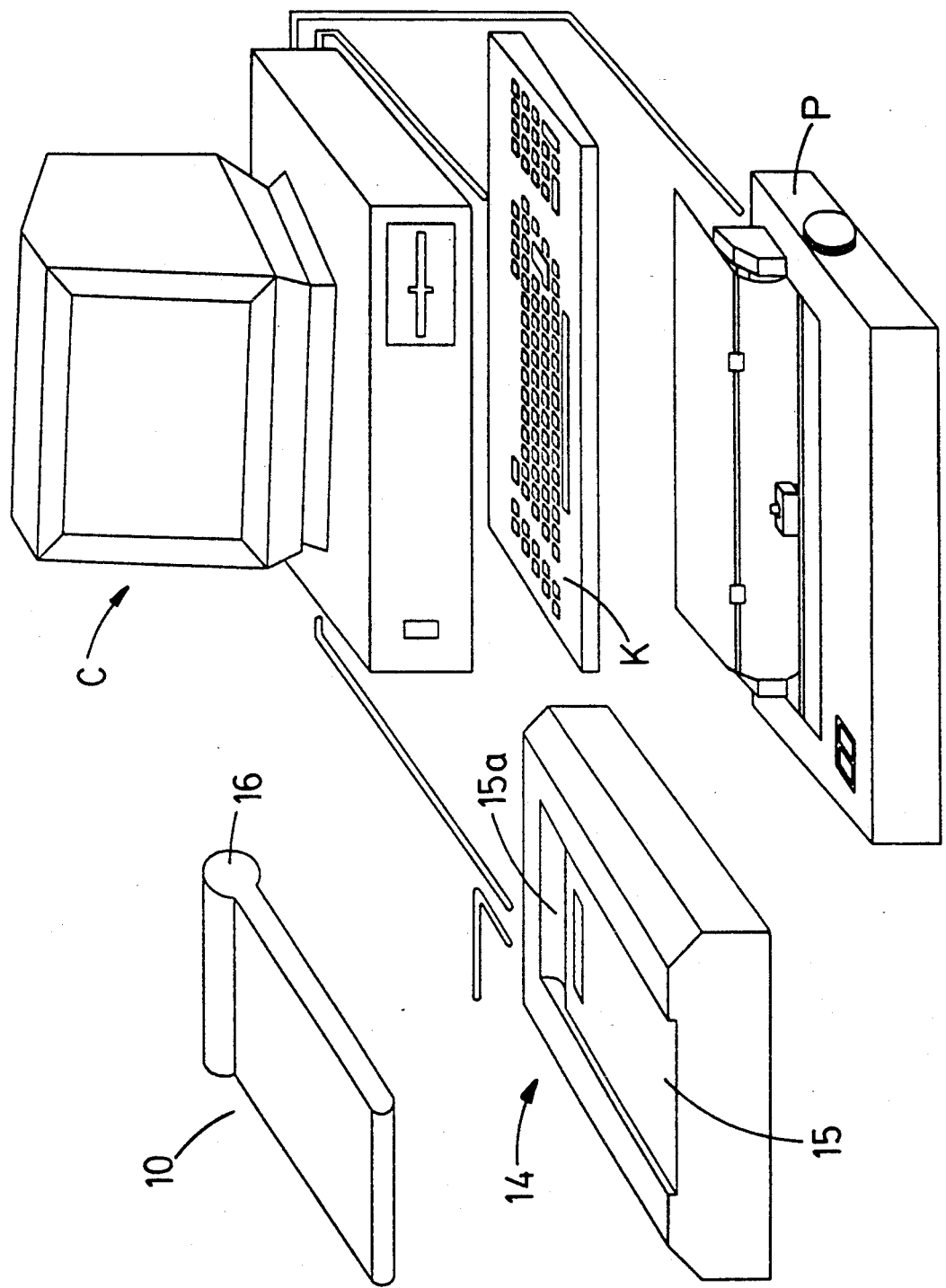
FIG. 3 is a perspective view of a typical arrangement of the reader device, the reader and a computer management system, FIGS. 4A and 4B combined form a circuit diagram of part of the c of the temperature recording device.

The reader 14 can be connected simply to a videotex terminal or computer screen. In the arrangement shown in FIG. 3 reader 14 is connected to computer C which in turn is connected to its keyboard K and printer P. This set up provides a computer management arrangement whereby information stored in the memory of device 10 can be read by reader 14 and then down loaded to computer C and stored and/or a hard copy printed.

For security each recorder 10 is customized such that a confidential access code must be used before the registered data can be read. Thus in use the memory of the recorder 10 will be reset and the recorder then placed in the environment to be monitored. At completion the registered data from the start of temperature measurements following a reset operation can be read or if the user choses, edited in the form of listings or graphic display either from the beginning or only for a certain period of time. Thus the user can only read data using the access code and cannot in any way alter the data. Additionally the reset and memory erase of the recorder can only be carried out using a confidential code.

Figure 4C:
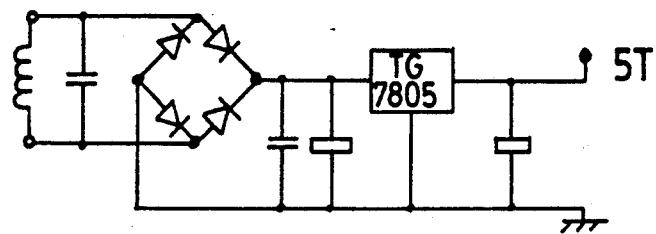
FIG. 4c is a schematic of a part of a power input circuit and rectifier which may be used in connection with the circuitry of the temperature recording device.
Figure 4A:
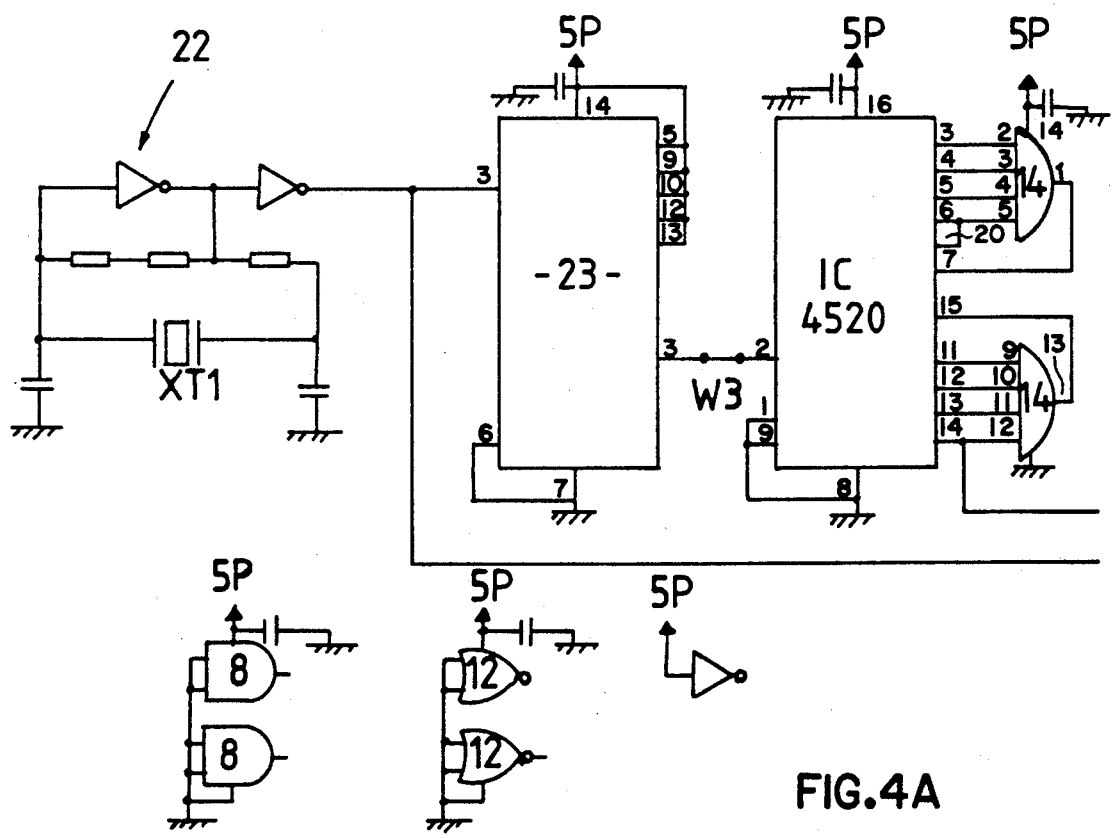
Figure 4B:
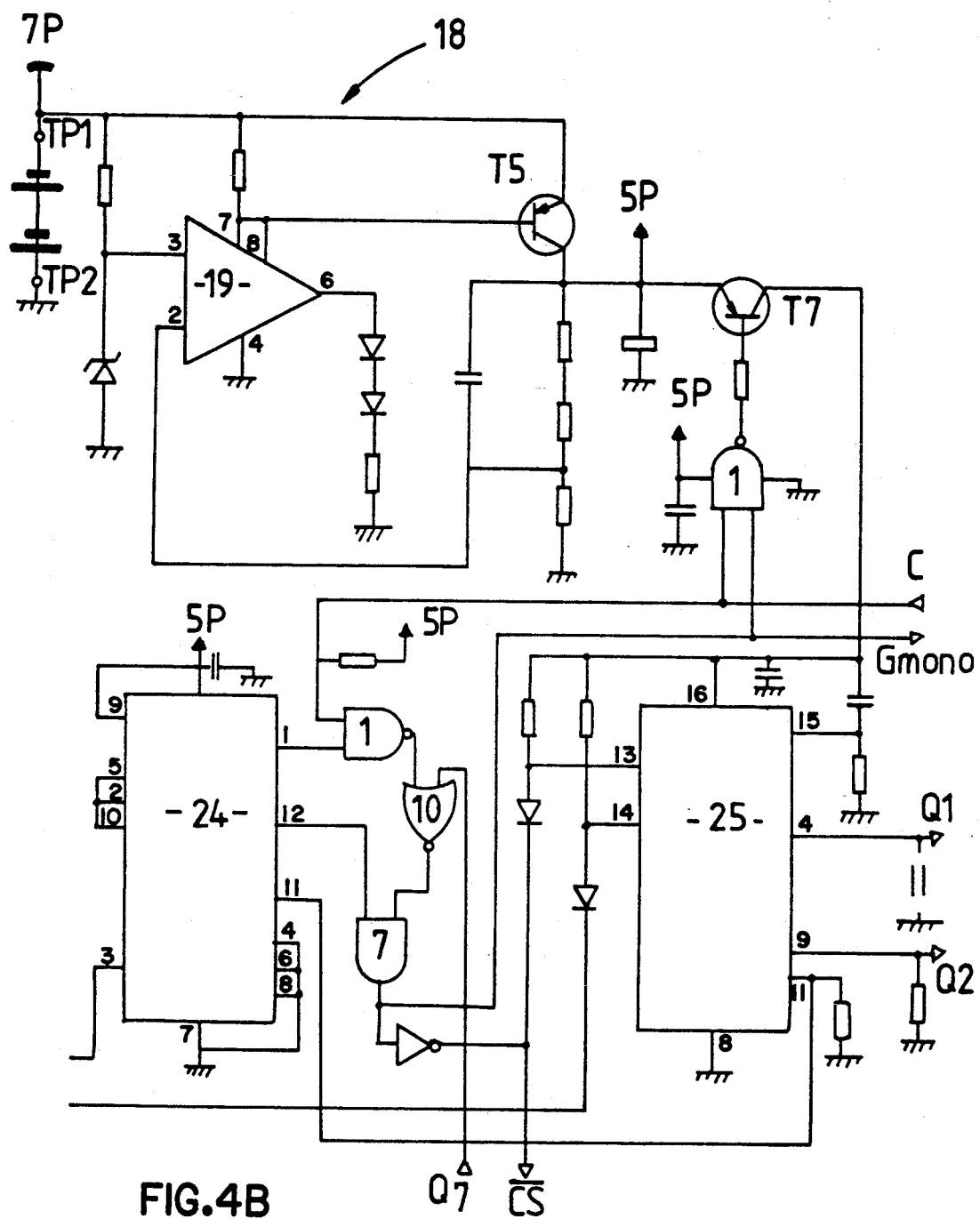
Figure 5A:
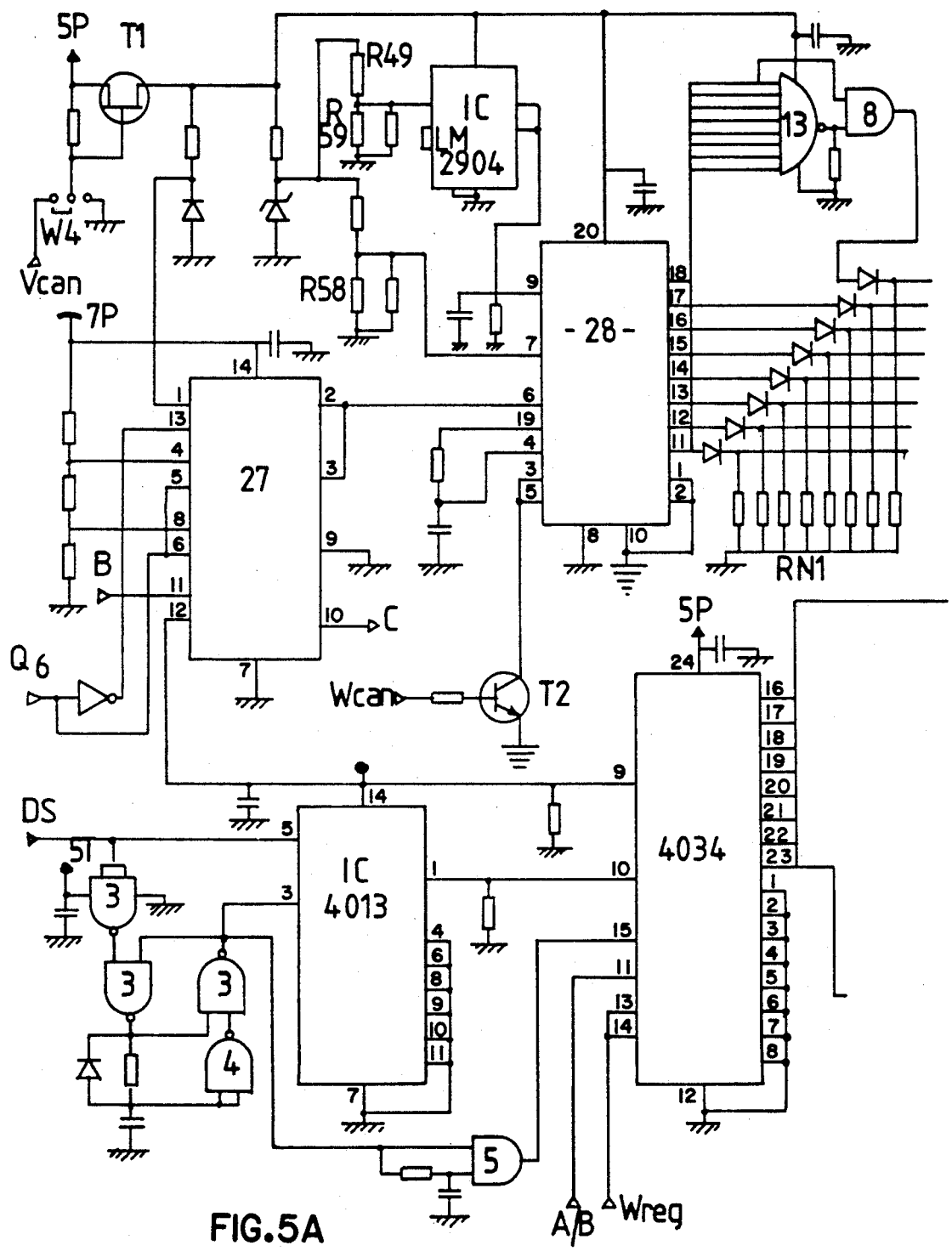
FIGS. 5A and 5B combined form a second circuit diagram of a second part of the temperature recording device, and FIGS. 6A and 6B combined form a circuit diagram of part of the reader.
Figure 5B:
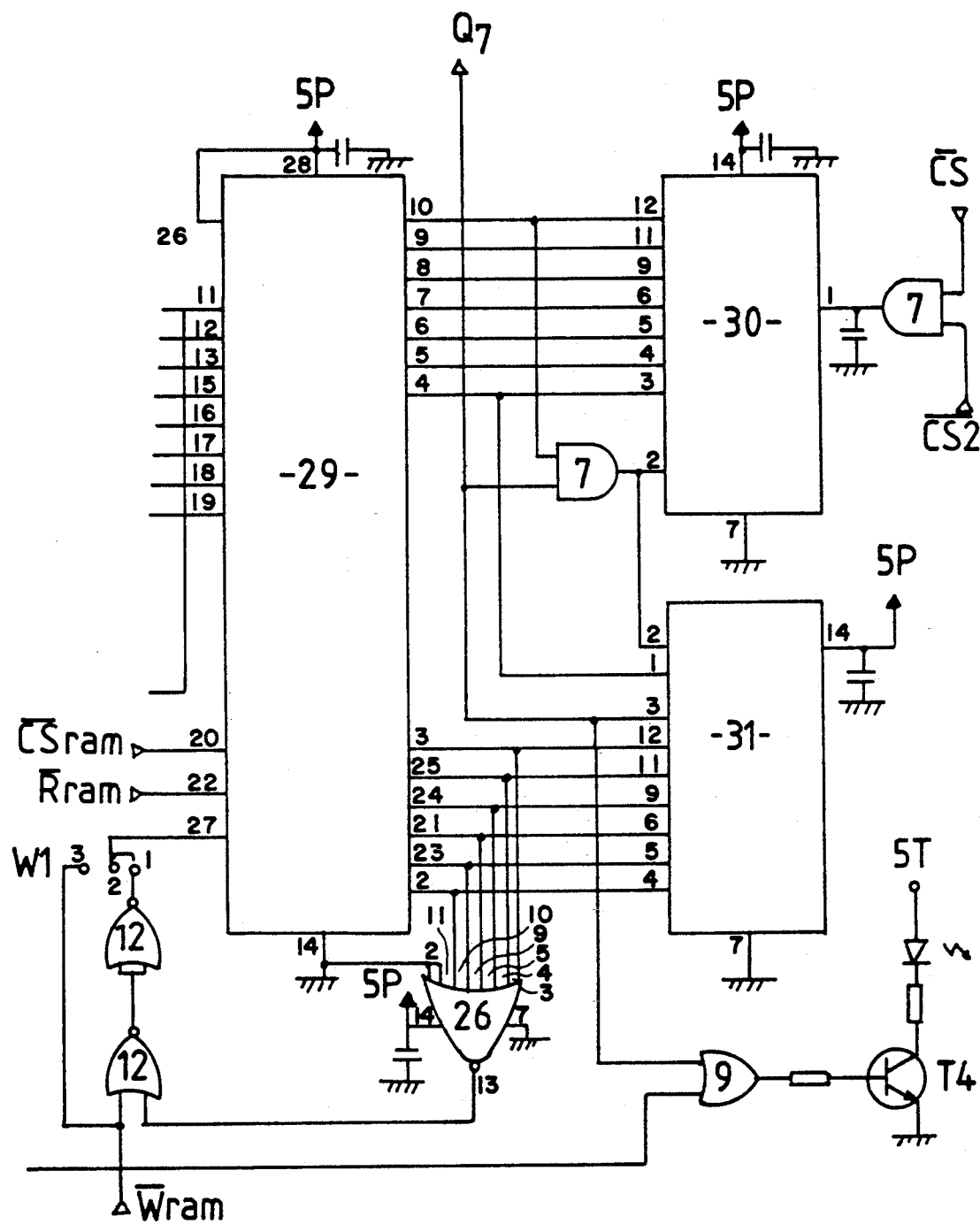

It will be appreciated by those skilled in the art that the internal circuitry of the recorder can take on may forms to achieve the functions described above. However, by way of example a form of circuitry is illustrated in FIGS. 4 and 5 of the drawings and reference will now be made to such drawings.

A regulator 18 constantly feeds the circuitry used for registering and memorising temperatures and a suitable regulator 19 is LM 7611 which has the advantage that is has a very low power consumption.

Through a coupling system 20 the voltage at the output of regulator 19 is compared to stable reference voltage supplied by a zener diode 21 (conveniently type LM 285 Z 2.5). The difference between the two voltages is amplified and this is translated by increasing or decreasing the current absorbed by the operational amplifier, i.e. a variation in the base-emitter voltage of the exit transistor. If the voltage is too low the transistor will allow more current to pass and so the voltage will increase, however, if it is too great the current will be weaker and the voltage will decrease.

A quartz clock 22 is employed as quartz has sufficient stability in frequency over a range of temperature changes. In the illustrated arrangement the frequency is 32.768 KHz.

To obtain a frequency division of $R2^{16}$ a frequency divider 23 (an MC 14541 circuit) is employed. The A and B inputs are sited at "1" to permit division by $2^{16}$ in the same way as the commands AR, Q/Q and Mode. The MR function is sited at "0". Thus an output frequency of 0.5 Hz is achieved.

The frequency divider 23 has two binary counters by 16. To do a division by 15 one only has to reset at 0 from the state 15. An ET door at four entries (MC 14082) fulfils this function.

To now achieve division by 2 an integrated circuit 24 (MC 14013) is employed with the result that at output 1 from IC a period signal 15 mn is obtained. It is, however, possible to obtain a period other than 15 mn by inserting an integrated circuit (MC 14040) between the divider by $2^{16}$ and that of 225 thereby obtaining a register of 30 mn, 1h, 2h or 4h according to the strap selected (W2).

A Johnson counter carries out the sequences of a recording of temperature. This is a counter/divider by 10 and as shown IC 25 (a type MC 14017) is used. It is fed for a complete sequence every quarter of an hour.

The reset RAZ permits temporisation up to the stability of the feeding. The Q2 provides the command for the start of the analogue/digital conversion, Q8 allows this to be written in memory and Q9 lets the sequence be reset to zero. The clock is directly linked to the quartz output (32.768 kHz).

Output Q2 acts directly on the conversion order of the converter (Wcan), Q8 on writing of the RAM (WE) and Q9 on the second T balance of the MC 15013 circuit.

The temperature probe 26 provides an analogue signal proportional to the temperature. Its accuracy and its nonlinear error are the two most critical features and an LM 335 meets these criteria.

To be able to select reading of the temperature or of the batteries as well as stopping the temperature readings/registrations an integrated circuit 27 (MC 14016) is used this being composed of four "switches" each of which is controlled by a clock acting on the high level. The first "switch" selects the temperature probe, the second the reading of the voltage of the batteries and the fourth stops the registrations. The third is used to limit consumption. When the voltage of the batteries is being read the switch enables input IN 3 be connected to earth and thus the voltage of the batteries is divided by the bridge R43-R46.

To handle the information an analogue/numeric convertor is employed. For precision and resolution under 8 bits hexadecimal an IC 28 (ADS 803 lcn) is chosen. The choice of limits depends on the conversion scale and for an 8 bit convertor there is an output of 256 possible combinations. For a resolution of $\frac{1}{4}°$ C. the temperature limit will be 64° C. The two reference potentials must be precise as any instability will cause variations in the conversion. As the stability of MOSFET is not correct a first voltage reference is established from a zener diode of 2.5V. However, as the temperature probe is not adjusted its variations must be taken into account. As the resistance values for R49 and R59 are calculated for a minimum voltage on the zener diode adjustment only requires the placing in parallel of a resistance on R58 and R59.

The mode chosen for the functioning of the analogue/numeric convertor will be a free-running mode. To achieve this RD and CS are positioned at "O". Passage to "O" state from INTR and WR provides for the free running mode.

The memory is a RAM 29 (HM3 2064.9) containing 8192 words of 8 bits. This allows for data to be stored either temperatures or transporter coordinates etc in hexadecimal language. An NOR gate on addresses A7 to A12 prevents any wiring (with good positioning of the W1 strap) on the first 128 addresses. The purposes is to be able to store the data and only after the housing 11 is open can this be effected. To right one must simply position CSI and WE at "O" and to read CSI and G must be put at "O". The sequences for recording temperature are as follows:

selection of RAM and incrementation of addresses
  signal for writing sent by Johnson counter
  state of vigil.

As the memory 29 contains $2^{13}$ addresses a counter for 13 states is required. The use of two counters 30 and 31 of 7 states suffices and in the preferred from the counter used is an MC 14024. To obtain the 13 desired states it is convenient to link the heaviest weight of the first counter 30 to the clock of the second 31. The last state of the second counter 31 serves as a check to memory 29. The counters are restarted when Q1 of the first counter passes to "1" and Q7 of the second is at "1". The clock of counter one is supplied by the time base.

A condenser enables any parasite impulsion to be removed which could increase the clock if there is a variation in input.

Figure 6A:
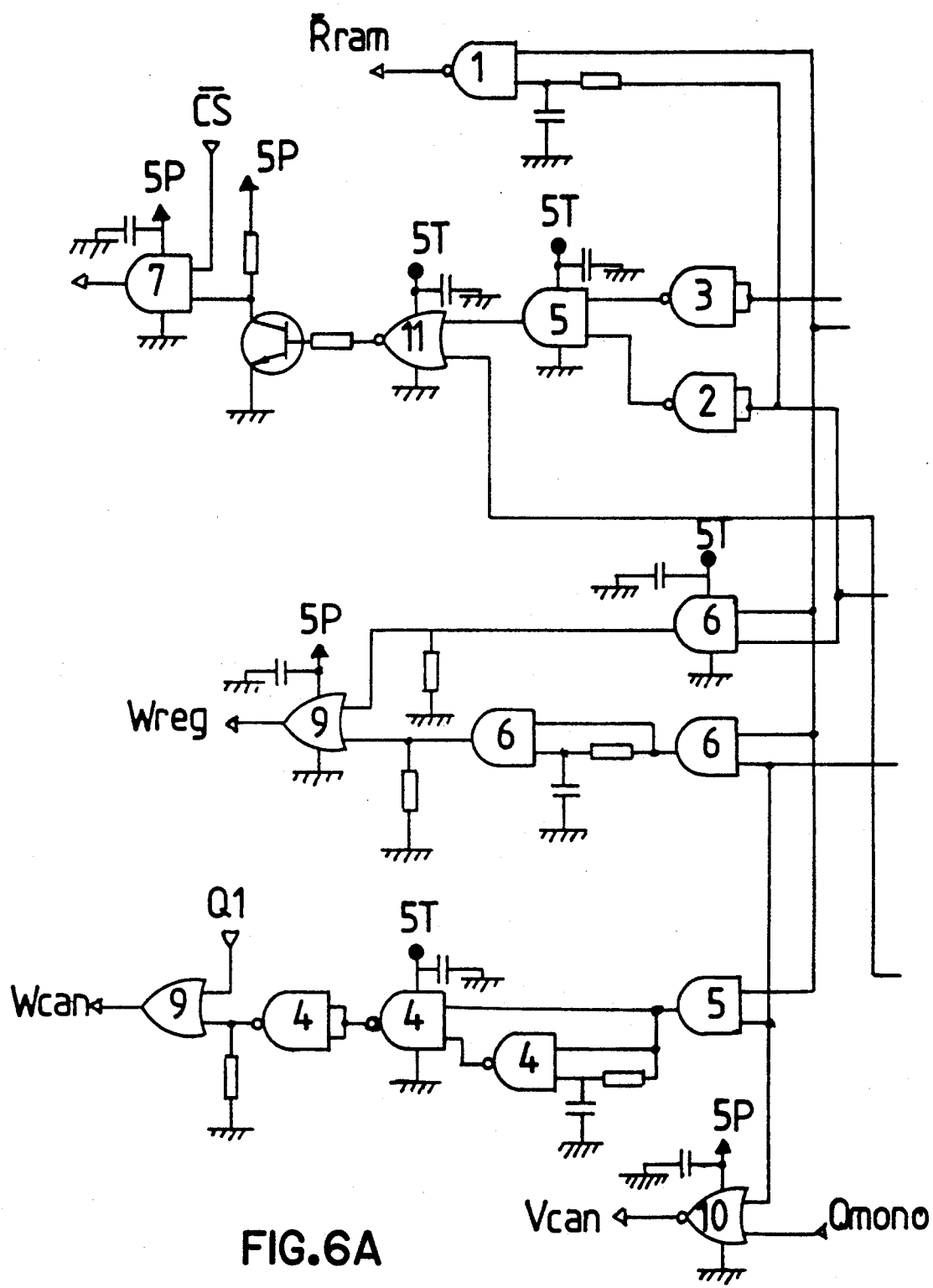
Figure 6B:
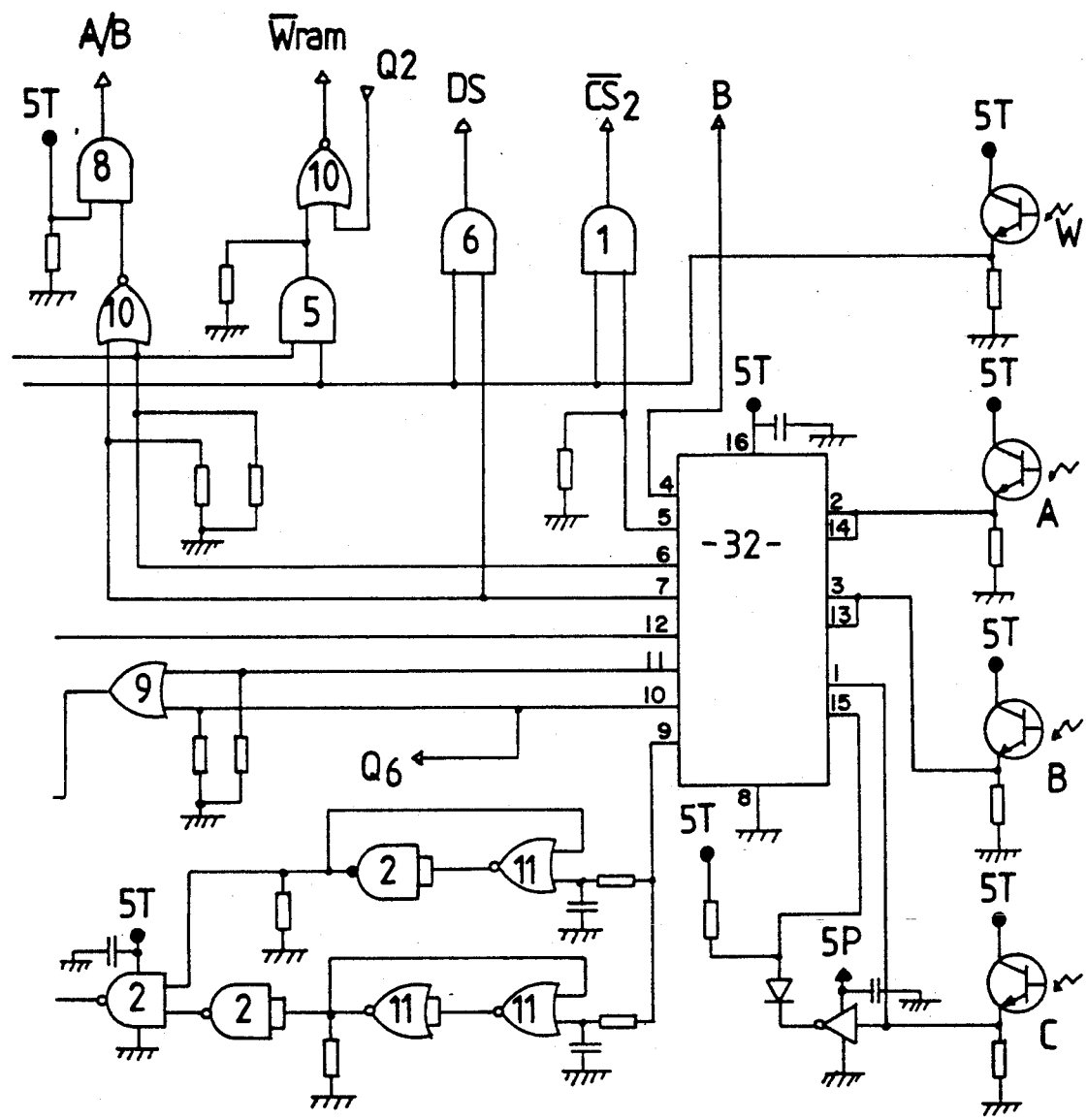

The reader (FIG. 6) supplies the data on four optocouplers and the signals of three of them are decoded by IC 32 (an MC 14555). IC 32 carries out a decoding of 3 by 8 given by the following table.

| F1 = F2 | B | A | O0 | O1 | O2 | O3 | O4 | O5 | O6 | O7 |
|---|---|---|---|---|---|---|---|---|---|---|
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

A precise command corresponds to these outputs:-
Q0: Normal Operation
Q1: Programming of Address Counter
Q2: Writing into RAM
Q3: Entry of Datum Series for Decoding
Q4: RAM Reading and Parallel Loading
Q5: Reading Captor, Conversion and Loading Order
Q6: Reading Batteries, Conversion and Loading Order
Q7: Disconnecting.

Normal Operation (O0)

When the recorder is positioned over the reader, this function allows temperatures to be recorded. In all other cases it blocks the system.

Programming of the Address Counter (O1)

If this output is chosen, impulsions supplied by LD1 can pass onto the counter's clock. This is increased.

Writing into RAM (O2)

When Q2 is at "1", there is selection of RAM (if the disconnecting is correct), and then writing. It also blocks the decoding register.

Entry of Data Series for Decoding (O3)

This allows the decoding of data coming in a series on LD1, decoded by 1.5 T before being put into parallel as a result of decoding register.

Reading of RAM (O4)

This function will select the RAM, make a reading of the data, put them in parallel onto the decoding register which will restore them in series on the single transmission diode.

Reading of the Captor (O5)

A high state on this output authorises the use and then the conversion of the tension of the temperature captor. Then there is parallel loading and then series output.

Reading of the Battery Tension (O6)

The principal is the same as in the preceding paragraph, with the sole difference that the selection is made on the reading of the batteries.

Disconnecting (O7)

The important thing is to be able to block any transmission if the code supplied is not correct. This code is a figure to which an impulsion is made to correspond of a size in proportion to the figure.

If the size is correct, a system of door authorises the selection of the RAM and thus all transmissions are possible.

The batteries chosen are preferably TL 2200 lithium and two in series are required to obtain the regulated voltage of 5 volts. These batteries are able to operate within working temperature ranges of $-55°$ centigrade to $+75°$ centigrade and provide long life discharge characteristics required.

The temperature recording system according to the present invention thus provides a recorder which is independent and inviolable and is able to memorize temperatures and any variations therein at regular intervals. The accuracy of the readings and its inviolability means that the recorder is an "impartial witness" and can thus be used for many purposes for monitoring temperatures especially as it can provide a guarantee that products stored and transported in controlled temperature environments are actually in good condition. The reader provides a ready means of interrogating the stored information and this can either be done locally or by using a telephone network it can be carried out remotely.

What is claimed is:

1. A temperature monitoring device comprising a sealed housing adapted for placement within an environment the temperature of which is to be monitored, said housing having located therein a temperature sensor and a storage system in which temperature readings can be stored, there being further provided a contactless communication means formed by infrared data transmission means, said housing including a window via which said transmission can occur and location means such that the housing can be located with a reader such that said window can align with an aperture of said reader whereby stored temperature readings can be transferred by infrared transmission through said window to said reader when said monitoring device is in position on said reader.

2. The device according to claim 1 wherein the housing is of unbreakable, watertight and inviolatable construction.

3. The device according to claim 1 wherein said housing is of generally flat configuration but includes a protruding portion which forms at least part of said location means.

4. The system as claimed in claim 3 wherein said protruding portion houses a power source for electronic circuitry located within the housing.

5. The device according to claim 1 further including electronic means for taking successive recordings of temperatures as sensed by the temperature sensor over a period of time.

6. The device of claim 5 wherein there is provided means for preventing access to the storage system except upon use of a unique security code transmitted via the reader to the device.

7. A temperature recording system comprising a temperature monitoring device as defined in claim 1 wherein said reader includes locating means with which the device can be positioned such that the communication means of the device registers with a communication means of the reader whereby temperature information stored in said storage means of the device can be transferred between said device and said reader.

8. The system of claim 7 wherein the housing is generally of flat configuration and is locatable in a locating area provided by said reader, said housing further including a protruding portion having a configuration which is locatable in a similarly configured recess provided with said reader, said recess being located adjacent said locating area.

9. The system of claim 8 wherein an aperture is formed in said locating area and is so positioned relative to said recess that when the protruding portion of the housing is located in said recess said aperture is aligned with the window of said housing.

10. The system as claimed in claim 8 wherein said protruding portion houses a power source for electronic circuitry located within the housing.

11. A temperature monitoring system including a reader device and a temperature monitoring devices said monitoring device comprising a sealed and inviolable housing, a temperature sensor located within said housing, means within said housing for taking successive temperature readings as sensed by the temperature sensor over a period of time, temperature storage means within said housing for storing said temperature readings, said reader device and said temperature monitoring device having cooperating locating means whereby the monitoring device can be placed on said reader device such that infrared data transmission means incorporated within said monitoring device can register with communication means of the reader and said temperature readings can be transferred between said monitoring device and said reader device.

12. The system according to claim 11 wherein said device has a window through which the infrared transmission can transmit to the reader via an aligned aperture in said reader.

* * * * *

UNITED STATES PATENT AND TRADEMARK OFFICE
CERTIFICATE OF CORRECTION

PATENT NO. : 5,211,476
DATED : May 18, 1993
INVENTOR(S) : Coudroy

It is certified that error appears in the above-identified patent and that said Letters Patent is hereby corrected as shown below:

Column 1, line 53, change "c" to read --circuitry--

Signed and Sealed this

Thirtieth Day of May, 1995

Attest:

Attesting Officer

BRUCE LEHMAN

Commissioner of Patents and Trademarks